United States Patent
Tullberg et al.

(10) Patent No.: US 11,251,835 B2
(45) Date of Patent: Feb. 15, 2022

(54) TECHNIQUE FOR PERFORMING POWER LEVEL CONTROL OF BEAMS TRANSMITTED BY A WIRELESS TRANSMISSION DEVICE

(71) Applicant: Telefonaktiebolaget LM Ericsson (publ), Stockholm (SE)

(72) Inventors: Hugo Tullberg, Nyköping (SE); Göran N. Klang, Enskede (SE); Miguel Lopez, Solna (SE); Imadur Rahman, Sollentuna (SE); Thomas Unshelm, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 561 days.

(21) Appl. No.: 16/087,359

(22) PCT Filed: Jul. 9, 2018

(86) PCT No.: PCT/EP2018/068541
§ 371 (c)(1),
(2) Date: Sep. 21, 2018

(87) PCT Pub. No.: WO2020/011333
PCT Pub. Date: Jan. 16, 2020

(65) Prior Publication Data
US 2020/0350954 A1    Nov. 5, 2020

(51) Int. Cl.
*H04B 5/00* (2006.01)
*H02J 50/90* (2016.01)
(Continued)

(52) U.S. Cl.
CPC ............ *H04B 5/0037* (2013.01); *H02J 50/20* (2016.02); *H02J 50/60* (2016.02); *H02J 50/90* (2016.02);
(Continued)

(58) Field of Classification Search
CPC .. H04B 5/0037; H04B 7/0617; H04B 7/0408; H04B 7/04; H02J 50/90; H02J 50/20; H02J 50/60; H02M 11/00
See application file for complete search history.

(56) References Cited

U.S. PATENT DOCUMENTS

2010/0079012 A1* 4/2010 Hyde ..................... H02J 50/30
                                                          307/149
2016/0197522 A1    7/2016 Zeine et al.
(Continued)

FOREIGN PATENT DOCUMENTS

WO    2019170228 A1    9/2019

*Primary Examiner* — Walter J DiVito
(74) *Attorney, Agent, or Firm* — Coats & Bennett, PLLC

(57) ABSTRACT

A technique for performing power level control of one or more beams transmitted by a wireless transmission device to a wireless reception device is disclosed. A method implementation of the technique is performed by the wireless transmission device and comprises transmitting (S202) each of the one or more beams at a default power level of the respective beam, detecting (S204) an obstacle entering the one or more beams based on a change in an electromagnetic environment associated with the one or more beams, the obstacle, once entered, at least partially blocking the one or more beams with respect to the wireless reception device, and decreasing (S206), for each of the one or more beams, an output power of the respective beam from the default power level of the respective beam to a predetermined threshold power level of the respective beam.

20 Claims, 13 Drawing Sheets

(51) Int. Cl.
*H02J 50/20* (2016.01)
*H02J 50/60* (2016.01)
*H04B 7/06* (2006.01)
*H02M 11/00* (2006.01)
*H04B 7/04* (2017.01)
*H04B 7/0408* (2017.01)

(52) U.S. Cl.
CPC ........... *H04B 7/0617* (2013.01); *H02M 11/00* (2013.01); *H04B 7/04* (2013.01); *H04B 7/0408* (2013.01)

(56) References Cited

U.S. PATENT DOCUMENTS

| | | | |
|---|---|---|---|
| 2016/0328660 A1* | 11/2016 | Huang | G06F 16/2462 |
| 2017/0077736 A1 | 3/2017 | Leabman | |
| 2019/0267840 A1* | 8/2019 | Rozbicki | G02F 1/163 |

\* cited by examiner

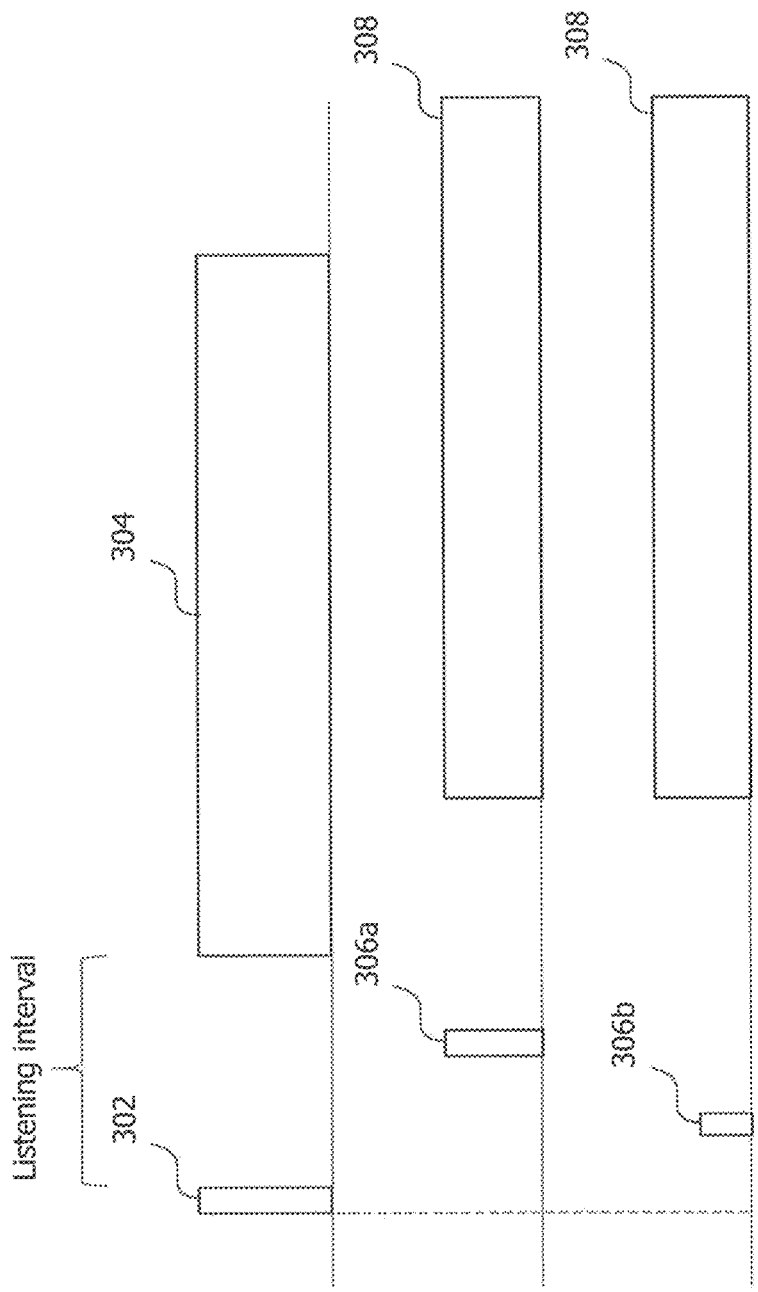

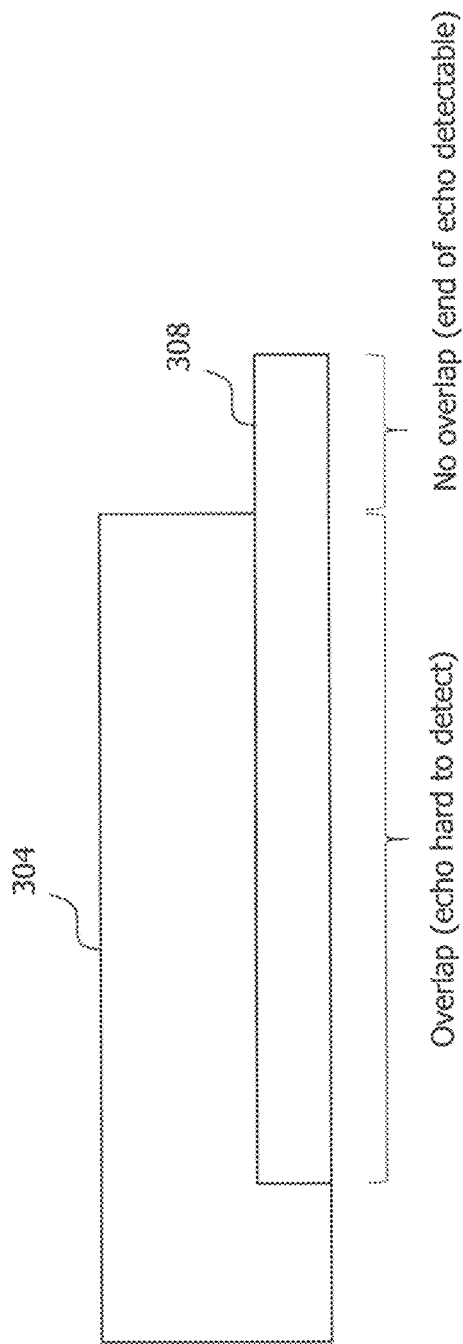

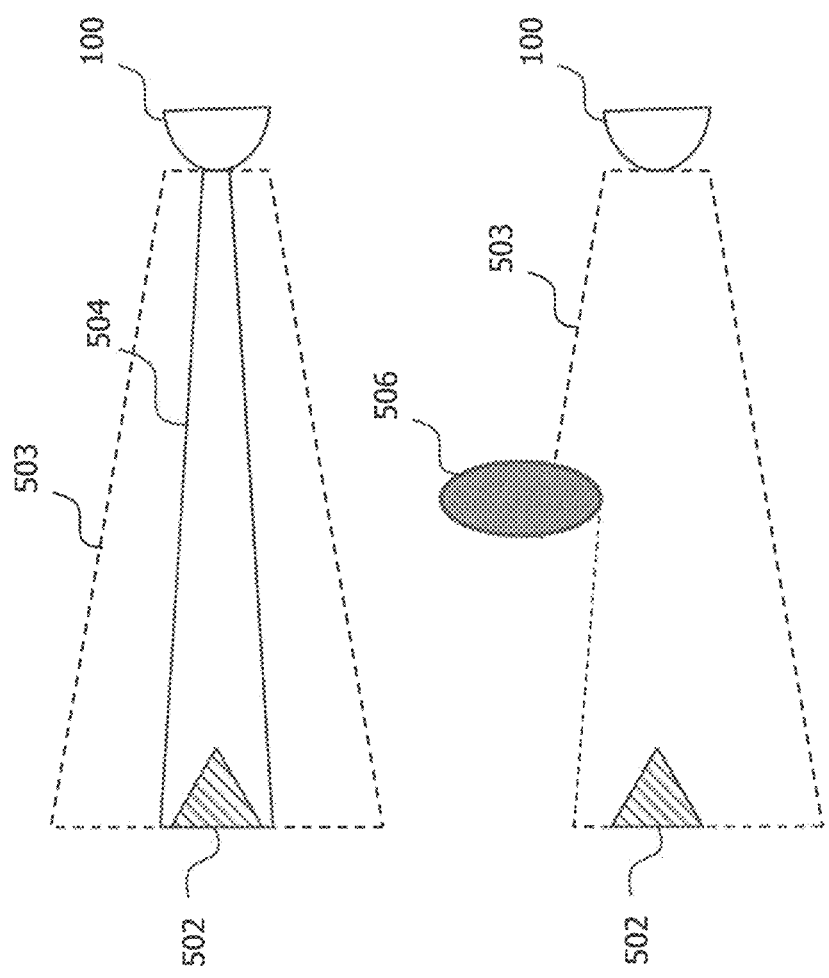

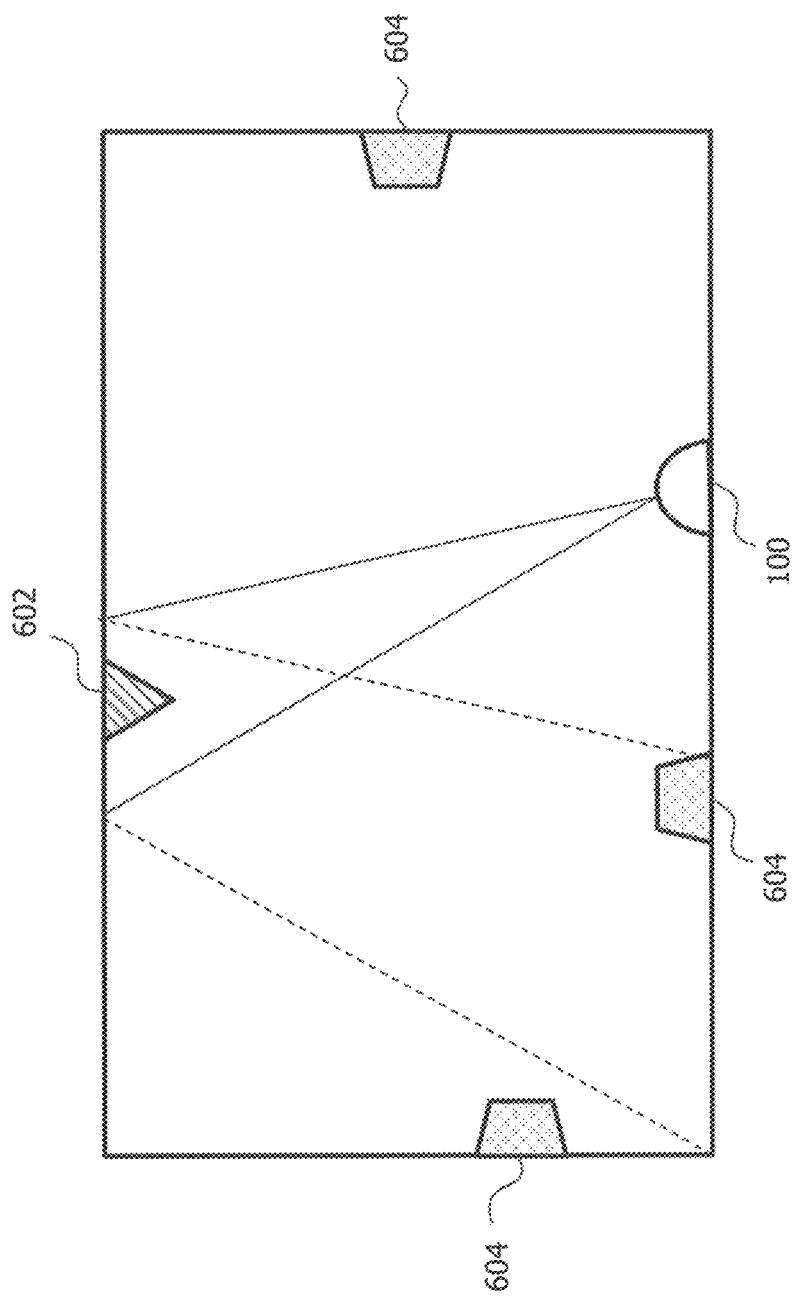

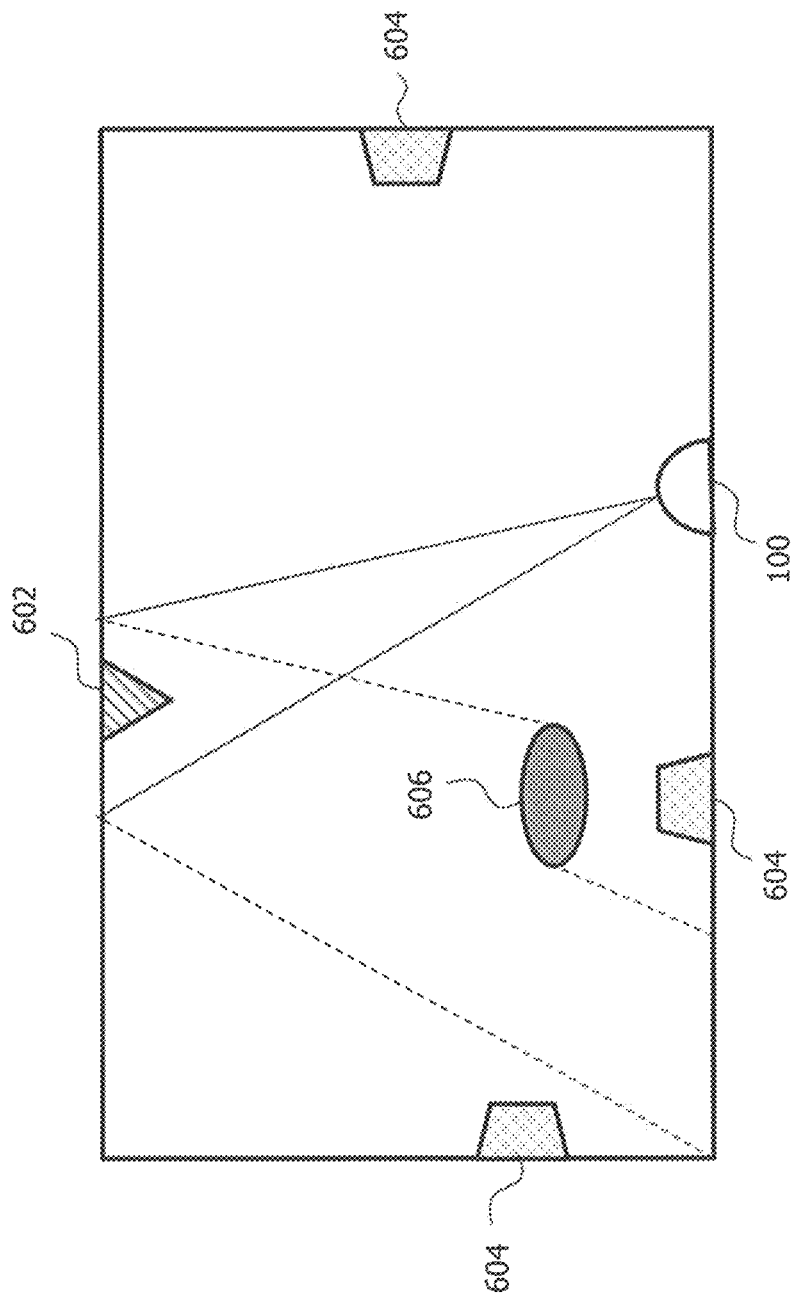

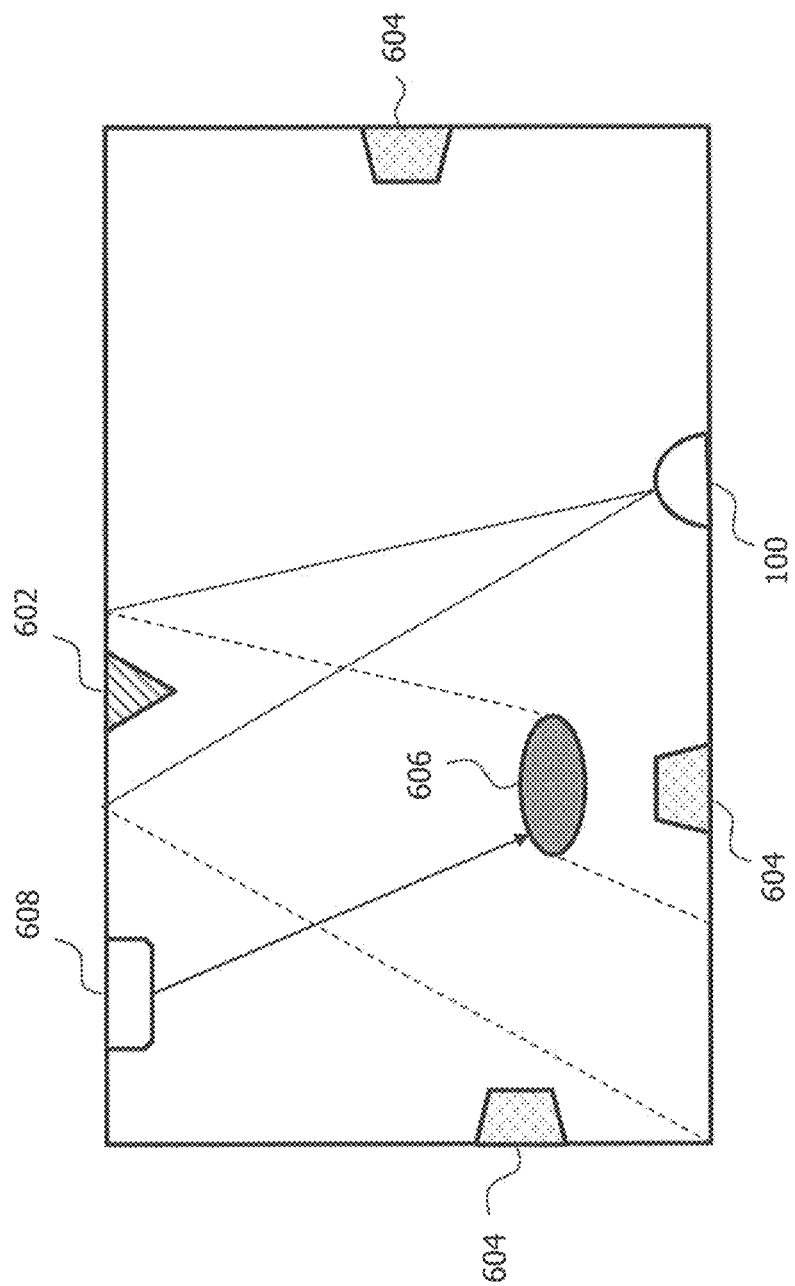

TECHNIQUE FOR PERFORMING POWER LEVEL CONTROL OF BEAMS TRANSMITTED BY A WIRELESS TRANSMISSION DEVICE

TECHNICAL FIELD

The present disclosure generally relates to the field of wireless signal transmission. In particular, a technique for performing power level control of one or more beams transmitted by a wireless transmission device to a wireless reception device is presented. The technique may be embodied in methods, computer programs, apparatuses and systems.

BACKGROUND

In recent years, the Internet of Things (IoT) has emerged as a general vision of systems of interrelated objects equipped with computing, networking and sensing capabilities enabling the objects to collect and exchange data without requiring human-to-computer interaction. In IoT systems, various use cases may be envisioned and, in many cases, it may be required that the involved wireless devices, such as wireless sensors, support long battery life so that, once deployed, the wireless devices may work for a long period of time.

While wireless charging of batteries over short distances, e.g., using charging stations for mobile phones supporting the open interface standard Qi, is a well-established technical field, techniques for wirelessly charging batteries over longer distances, e.g., up to 100 m, have not yet been adopted to a similar extent. These techniques are typically based on a transmitter which transmits a charging beam with several Watts of output power through one or more antennas steered to a receiving device. The device receiving the charging beam may have a battery that needs to be recharged and, in other examples, the receiving device may require charging a capacitor to operate. The charging beam may be a single well-concentrated beam or a multidirectional beam, for example, as it may be the case in massive Multiple-Input Multiple-Output (MIMO) systems.

For longer distance charging, highly directional beams are generally required. A problem with highly directional beams for energy transfer, however, is that they may not be compliant with electromagnetic field (EMF) and corresponding health/safety regulations. In a massive MIMO scenario, if multiple beams are used, the power level of each separate beam may be within EMF regulation limits, while the converged beams may produce a sufficient power level to charge a receiving device. If a single beam is used for charging, on the other hand, the power level may need to be higher and may thus exceed current EMF regulation limits. If a person enters such a charging beam, health hazards may be the consequence.

SUMMARY

Accordingly, there is a need for a technique that avoids health hazards during wireless transmission, or other problems.

According to a first aspect, a method for performing power level control of one or more beams transmitted by a wireless transmission device to a wireless reception device is provided. The method is performed by the wireless transmission device and comprises transmitting each of the one or more beams at a default power level of the respective beam, detecting an obstacle entering the one or more beams based on a change in an electromagnetic environment associated with the one or more beams, the obstacle, once entered, at least partially blocking the one or more beams with respect to the wireless reception device, and decreasing, for each of the one or more beams, an output power of the respective beam from the default power level of the respective beam to a predetermined threshold power level of the respective beam.

Power level control of the one or more beams may thus be performed to decrease the output power of the one or more beams in order to prevent EMF regulation violation and, hence, to prevent health hazards when the obstacle that enters the one or more beams is a living body, such as a human being or animal, for example. The predetermined threshold power level of the respective beam to which the output power of the respective beam is decreased may be set to comply with an EMF regulation (e.g., a predetermined allowed maximum power level, such as a maximum power level specified by a governmental regulation, for example) to prevent exposure of the obstacle to excessive electromagnetic radiation. When it is detected that the obstacle no longer blocks the one or more beams with respect to the wireless reception device, on the other hand, the wireless transmission device may increase, for each of the one or more beams, the output power of the respective beam from the predetermined threshold power level of the respective beam to the default power level of the respective beam. Therefore, if the obstacle is detected to exit the one or more beams again, the output power of the respective beam may be increased to a power level exceeding a level that complies with EMF regulations to thereby improve wireless transmission quality.

The wireless transmission device may be a device capable of transmitting wireless signals using beamforming technology. For example, the wireless transmission device may comprise one or more antennas whose weights may be set in a particular combination to generate a beamformed signal having a radiation pattern directed to the wireless reception device. In one variant, the one or more beams transmitted by the wireless transmission device may be used for transmission of communication signals only, e.g., communication signals transmitted from a base station to a User Equipment (UE) in a wireless communication system. In another variant, the one or more beams may correspond to charging beams used for wirelessly charging the wireless reception device. In a wireless communication system, a charging beam may be a dedicated charging beam or an idle beam currently not being used for communication, or the charging beam may result from one or more communication signals transmitted to the wireless reception device anyway, such as from broadcast signals transmitting System Information (SI), or the like. It will be understood that the wireless transmission device may also be a dedicated charging transmitter that is not capable of transmitting communication signals. A charging beam may be transmitted with a certain output power through one or more antennas of the wireless transmission device.

The wireless transmission device may be a fixed device, e.g., a base station in a 4G or 5G network or an access point in a Wireless Local Area Network (WLAN), but may also be given by a moving device, e.g., a drone flying around to charge other wireless reception devices. Even a UE capable of transmitting charging beams according to the technique presented herein may be a wireless transmission device as understood herein. The wireless reception device may comprise a battery that needs to be recharged or the wireless reception device may require charging a capacitor to operate, wherein the wireless reception device may be configured to transform the received charging beams to a current that is suitable for running the wireless reception device and/or charge its battery. The wireless reception device may be a UE a wireless communication system or a wireless sensor in an IoT environment, for example.

In case the one or more beams correspond to charging beams used for wirelessly charging the wireless reception device, the default power level of the respective beam may correspond to a charging power level that exceeds a level complying with EMF regulations. In particular, the default power level of the respective beam may correspond to a maximum charging power level for the wireless reception device. Therefore, when no obstacle is detected to be in the transmission area (i.e., the radiation region) of the one or more beams, the output power of the respective beam may be set to the maximum charging power level (e.g., again, a power level that exceeds a level complying with EMF regulations) to improve wireless charging efficiency without causing health hazards. To essentially eliminate the risk of health hazards in case of wireless charging, decreasing the output power of the respective beam may include deactivating the respective beam entirely.

Instead of decreasing the output power of the respective beam (or deactivating the respective beam) when it is detected that the obstacle at least partially blocks the one or more beams with respect to the wireless reception device, an alternative beam direction may be used for each of the one or more beams so that the obstacle no longer within the transmission area of the one or more beams, and the one or more beams may thus continue to be transmitted at the default power level. In some variants, environmental conditions may be taken into consideration and the alternative beam direction may hence result, for each of the one or more beams, in the respective beam being reflected before reaching the wireless reception device. In other words, the direction of the respective beam may be altered to circumvent the obstacle before arriving at the wireless reception device.

Various ways of detecting the obstacle that enters the one or more beams based on a change in the electromagnetic environment associated with the one or more beams are generally conceivable. In one implementation, each of the one or more beams may be transmitted using a repetitive waveform pattern comprising a detection phase and a transmission phase, wherein, in the detection phase, one or more detection pulses are transmitted and their echo is monitored prior to the transmission phase to detect the change in the electromagnetic environment associated with the one or more beams. The one or more detection pulses may correspond to short pulses dedicated to the detection of beam blockage. Each detection pulse may have a low total energy, i.e., the power level of a detection pulse may comply with EMF regulations. The transmission phase, on the other hand, may comprise a longer transmission pulse (e.g., charging pulse) at the default power level of the respective beam, as described above. The one or more detection pulses may be used in the sense of a radar system, wherein the echo of the one or more detection pulses is monitored to detect beam blockage. Monitoring the echo of the one or more detection pulses may comprise measuring at least one of an echo level (e.g., an amplitude of the echo) and a time from detection pulse transmission to echo reception. The duration of the transmission phase may be such that, if an obstacle (e.g., a human being) enters the beam, the total amount of energy transmitted before the subsequent detection pulse is within an amount that complies with EMF regulations.

The change in the electromagnetic environment associated with the one or more beams may alternatively or additionally be detected based on measuring a time from an end of the transmission phase to an end of an echo of the transmission phase. The end of the transmission phase may correspond to a trailing edge of a transmission pulse (e.g., charging pulse) and the end of the echo of the transmission phase may correspond to a trailing edge of the echo of the transmission pulse. Thus, instead of using separate detection pulses for the detection of beam blockage, as described above, the transmission pulse itself may be used for the detection of beam blockage, which may be possible in cases where the echo to the transmission pulse returns after the end of the transmission pulse because, at that time, echoes of the transmission pulse are generally detectable since echoes are no longer obscured by the higher power transmission of the transmission pulse itself.

Alternatively or additionally, two beams pointing in the same direction, one wider and one narrower, may be simultaneously formed. In such an implementation, each of the one or more beams may form an inner beam which is shrouded by an outer beam pointing into a same direction as the inner beam, the outer beam being wider than the inner beam, wherein the change in the electromagnetic environment associated with the one or more beams may be detected based on a change in a reflection pattern of the outer beam. In such a scenario, the outer beam may be used for the detection of beam blockage and the inner beam may be used for the actual wireless transmission (e.g., for wireless charging). The outer beam may in this case be distinguished from the inner beam by at least one of a different frequency and a different transmission pattern, for example. Also, the outer beam may have a lower power level than the inner beam and, when a change in the reflection pattern of the outer beam is detected, the power level of the inner beam may be decreased (or the inner beam may be turned off), as described above. In one variant, the power level of the outer beam may not be decreased when decreasing the power level of respective beam (i.e., the inner beam). In this case, the power level of the outer beam may be low enough to remain on when the obstacle enters the outer beam (i.e., the power level of the outer beam may comply with EMF regulations) so that the outer beam can be used to detect the obstacle exiting the outer beam again and, hence, to safely increase the power level of the inner beam (or turn on the inner beam) again when the obstacle exits the outer beam.

Generally, detecting a change in the electromagnetic environment associated with the one or more beams may be carried out using one or more detectors. The one or more detectors may be comprised by the wireless transmission device or may be disposed at locations separate from the wireless transmission device. If the wireless transmission device is a communications transceiver, in particular when the transceiver is capable of performing full duplex transmissions, the detector may be the receiver portion of the transceiver.

In a scenario with detectors disposed separately from the wireless transmission device, the change in the electromagnetic environment associated with the one or more beams may be detected using one or more detectors placed remotely from the wireless transmission device, wherein the one or more detectors may be configured to detect changes in an electromagnetic radiation pattern observable in a transmission area (e.g., radiation region) of the one or more beams (e.g., in a room). The electromagnetic radiation pattern observed by the one or more detectors may in such a case not only depend on the one or more beams transmitted by the wireless transmission device itself, but also on any other wireless transmitters present at or close to the transmission area, such as WLAN access points in a room or building, for example. When an obstacle (e.g., a person) enters the transmission area and the resulting change of the electromagnetic radiation pattern is detected, the output power of the respective beam may be decreased or the respective beam may be deactivated, as described above. To avoid false alarms in scenarios with additional wireless transmitters that influence the electromagnetic radiation pattern observed in the transmission area, not only one, but multiple detectors may be employed. The change in the electromagnetic environment associated with the one or more beams may thus be detected using a plurality of detectors placed remotely from the wireless transmission device.

To increase detection accuracy, a machine learning based model may be employed to distinguish between obstacles sensitive to electromagnetic radiation (e.g., a human being) and obstacles insensitive to electromagnetic radiation (e.g., a moving device or furniture) detected by the respective detectors, wherein decreasing the output power of the respective beam may (e.g., only) be performed when the obstacle is determined to be an obstacle sensitive to electromagnetic radiation. In other words, machine Intelligence may be employed to distinguish between safe and hazardous situations. The machine learning based model may be trained in a cloud computing environment (especially when the delays introduced by a cloud implementation do not lead to degraded performance) as more data may be available and processable in the cloud for the purpose of learning environmental characteristics and safe/hazardous situations.

In the foregoing description, the technique presented herein has been outlined for the case that the wireless transmission device serves a single wireless reception device. It will be understood, however, that the wireless transmission device may serve multiple reception devices within its coverage range in the same manner. In such a case, the wireless transmission device may transmit, to each of one or more additional wireless reception devices, one or more additional beams, wherein the wireless transmission device may serve the wireless reception device and the one or more additional wireless reception devices according to a round robin strategy or according to priorities of the respective wireless reception devices, for example.

According to a second aspect, a computer program product is provided. The computer program product comprises program code portions for performing the method of the first aspect when the computer program product is being executed on one or more computing devices, e.g., on a wireless transmission device. The computer program product may be stored on a computer readable recording medium, such as a semiconductor memory, DVD, CD-ROM, and so on.

According to a third aspect, a wireless transmission device configured to perform power level control of one or more beams transmitted by the wireless transmission device to a wireless reception device is provided. The wireless transmission device comprises processing means configured to transmit each of the one or more beams at a default power level of the respective beam, detect an obstacle entering the one or more beams based on a change in an electromagnetic environment associated with the one or more beams, the obstacle, once entered, at least partially blocking the one or more beams with respect to the wireless reception device, and decrease, for each of the one or more beams, an output power of the respective beam from the default power level of the respective beam to a predetermined threshold power level of the respective beam.

The wireless transmission device may be configured to perform any of the method steps presented herein with respect to the first aspect. The processing means may comprise at least one processor and at least one memory, wherein the at least one memory contains instructions executable by the at least one processor such that the processing means are operable to perform the method steps presented herein.

According to a fourth aspect, there Is provided a system comprising a wireless transmission device and a wireless reception device in accordance with the third aspect.

BRIEF DESCRIPTION OF THE DRAWINGS

Embodiments of the technique presented herein are described herein below with reference to the accompanying drawings, in which:

FIG. 3 illustrates an exemplary repetitive waveform pattern comprising a detection pulse followed by a transmission pulse and corresponding echoes in case of absence and presence of an obstacle blocking the transmitted beam;

FIG. 4 illustrates an exemplary transmission pulse and a corresponding echo that is used for the detection of beam blockage;

FIG. 5 illustrates an exemplary outer beam shrouding an inner beam and the fact that detection of beam blockage by the outer beam can be used to turn off the inner beam;

FIG. 6a illustrates an exemplary room geometry including detectors placed remotely from the wireless transmission device, where an obstacle blocking the transmitted beam is absent;

FIG. 6c illustrates the room geometry of FIG. 6a in case of presence of an obstacle blocking a reflection of the transmitted beam;

FIG. 6e illustrates the room geometry of FIG. 6d in case the obstacle blocks the beams of the additional wireless transmitter;

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, while the following embodiments will largely be described with regard to aspects of wireless charging, it will be understood that the present disclosure shall not be limited thereto and that the technique presented herein may be practiced with wireless devices that are used for transmission of communication signals only as well.

Those skilled in the art will further appreciate that the steps, services and functions explained herein below may be implemented using individual hardware circuitry, using software functioning in conjunction with a programmed microprocessor or general purpose computer, using one or more application specific integrated circuits (ASICs) and/or using one or more digital signal processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
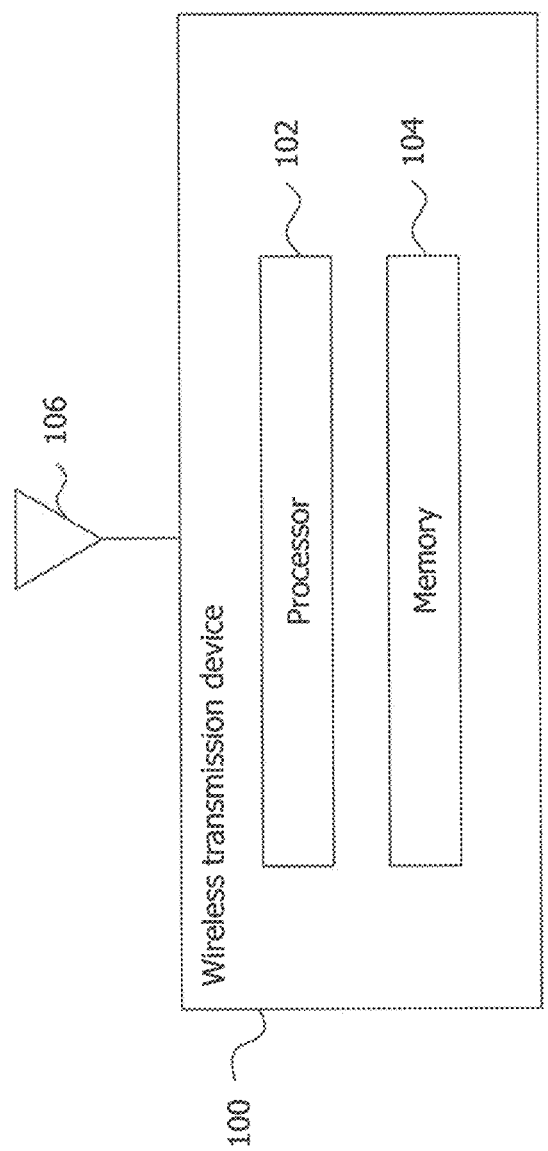
FIG. 1 illustrates an exemplary embodiment of a wireless transmission device according to the present disclosure.

FIG. 1a schematically illustrates an exemplary embodiment of a wireless transmission device 100 which is configured to perform power level control of one or more beams transmitted by the wireless transmission device 100 to a wireless reception device. The wireless transmission device 100 comprises processing means enabling the wireless transmission device 100 to perform the method steps described herein below. In the shown example, the processing means comprise at least one processor 102 and at least one memory 104, wherein the at least one memory 104 contains instructions executable by the at least one processor 102 such that the processing means are operable to carry out the method steps described herein.

The wireless transmission device 100 comprises one or more antennas 106 for transmitting the one or more beams to the wireless reception device. The wireless transmission device 100 may in particular be a device capable of transmitting wireless signals using beamforming technology. For example, the weights of the one or more antennas 106 may be set in a particular combination to generate a beamformed signal having a radiation pattern directed to the wireless reception device. In one variant, the one or more beams transmitted by the wireless transmission device 100 may be used for transmission of communication signals, e.g., communication signals transmitted from a base station to a UE in a wireless communication system. In another variant, the one or more beams may correspond to charging beams used for wirelessly charging the wireless reception device. In a wireless communication system, a charging beam may be a dedicated charging beam or an idle beam currently not being used for communication, or the charging beam may result from one or more communication signals transmitted to the wireless reception device anyway, such as from broadcast signals transmitting SI, or the like. It will be understood that the wireless transmission device 100 may also be a dedicated charging transmitter that is not capable of transmitting communication signals. A charging beam may be transmitted with a certain output power through the one or more antennas 106 of the wireless transmission device 100.

The wireless transmission device 100 may be a fixed device, e.g., a base station in a 4G or 5G network or an access point in a WLAN, but may also be given by a moving device, e.g., a drone flying around to charge other wireless reception devices. Even a UE capable of transmitting charging beams according to the technique presented herein may be a wireless transmission device as understood herein. As such, it will be understood that the processing means of the wireless transmission device 100 may belong to a physical computing unit as well as to a virtualized computing unit, such as a virtual machine, for example. It will further be appreciated that the processing means may not necessarily be implemented in standalone form, but may be implemented as components—realized in software and/or hardware—residing on multiple distributed computing units as well.

The wireless reception device, on the other hand, may comprise a battery that needs to be recharged or the wireless reception device may require charging a capacitor to operate, wherein the wireless reception device may be configured to transform the received charging beams to a current that is suitable for running the wireless reception device and/or charge its battery. The wireless reception device may be a UE In a wireless communication system or a wireless sensor in an IoT environment, for example.

Figure 2A:
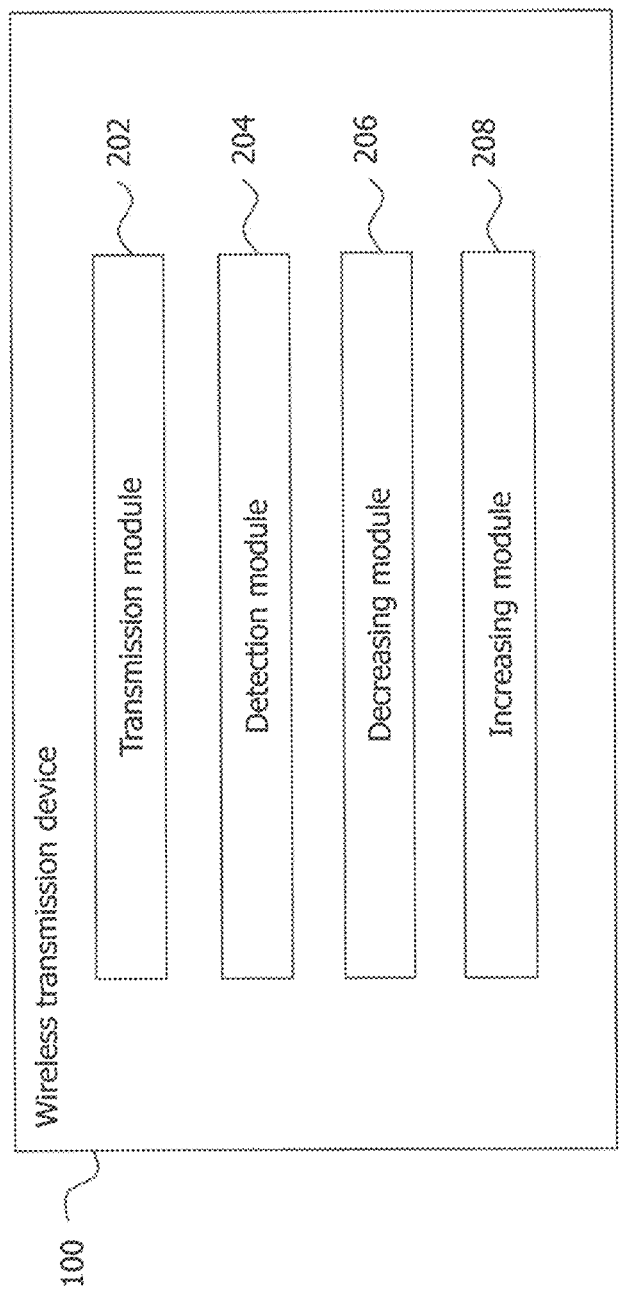
FIGS. 2a and 2b illustrate a module based design of a wireless transmission device according to an embodiment of the present disclosure and a corresponding method embodiment which may be performed by the wireless transmission device.
Figure 2B:
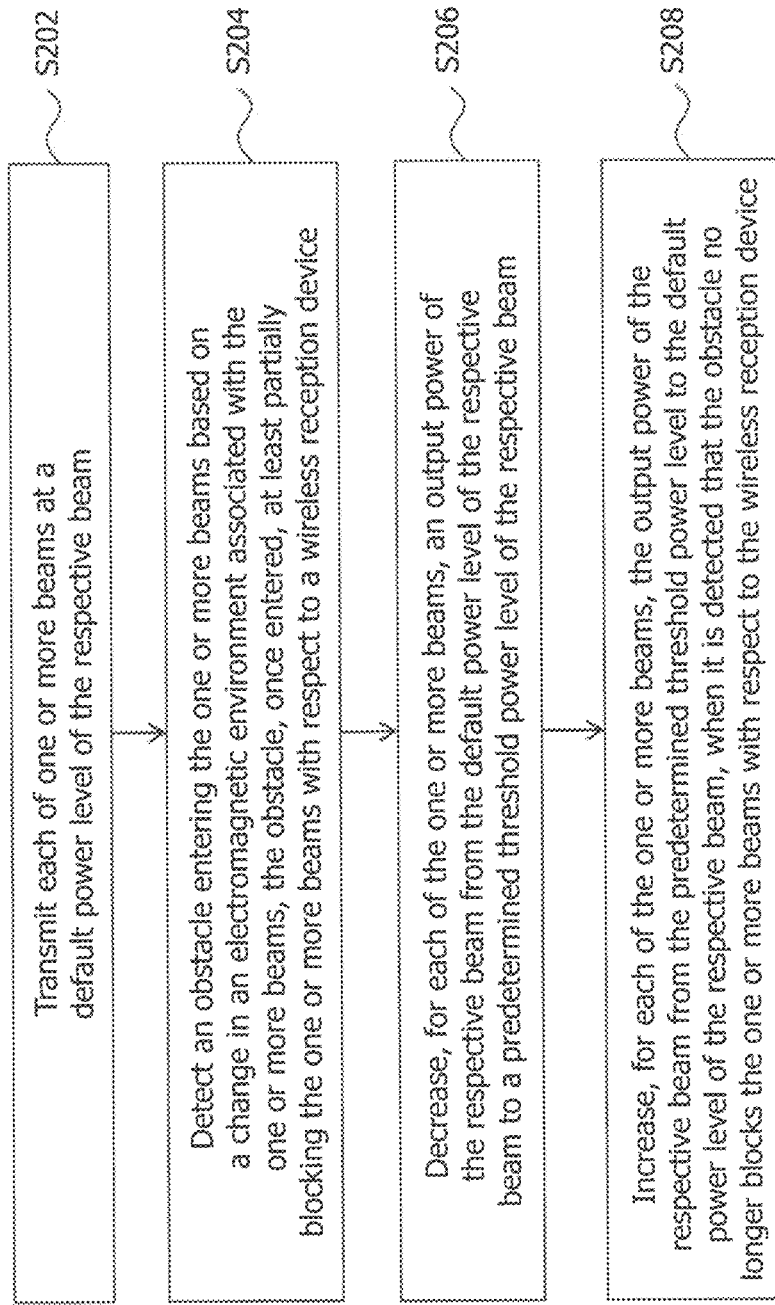

FIG. 2a schematically illustrates an exemplary module based design of the wireless transmission device 100 and FIG. 2b Illustrates a corresponding method embodiment which may be performed by the wireless transmission device 100. Each module shown in FIG. 2a may correspond to a component that is realized in hardware and/or software. In particular, the functionality of each module may be implemented by the at least one processor 102 and the at least one memory 104 of the wireless transmission device 100 described above in relation to FIG. 1. The basic operation of the wireless transmission device 100 will be described in the following with reference to both FIGS. 2a and 2b.

In step S202, a transmission module 202 of the wireless transmission device 100 may transmit each of the one or more beams at a default power level of the respective beam. In step S204, a detection module 204 of the wireless transmission device 100 may detect an obstacle entering the one or more beams based on a change in an electromagnetic environment associated with the one or more beams, the obstacle, once entered, at least partially blocking the one or more beams with respect to the wireless reception device. In step S206, a decreasing module 206 of the wireless transmission device 100 may decrease, for each of the one or more beams, an output power of the respective beam from the default power level of the respective beam to a predetermined threshold power level of the respective beam.

Power level control of the one or more beams may thus be performed to decrease the output power of the one or more beams in order to prevent EMF regulation violation and, hence, to prevent health hazards when the obstacle that enters the one or more beams Is a living body, such as a human being or animal, for example. The predetermined threshold power level of the respective beam to which the output power of the respective beam is decreased may be set to comply with an EMF regulation (e.g., a predetermined allowed maximum power level, such as a maximum power level specified by a governmental regulation, for example) to prevent exposure of the obstacle to excessive electromagnetic radiation. When it is detected that the obstacle no longer blocks the one or more beams with respect to the wireless reception device, an increasing module 208 of the wireless transmission device 100 may increase, in step S208, for each of the one or more beams, the output power of the respective beam from the predetermined threshold power level of the respective beam to the default power level of the respective beam. Therefore, if the obstacle is detected to exit the one or more beams again, the output power of the respective beam may be increased to a power level exceeding a level that complies with EMF regulations to thereby Improve wireless transmission quality (e.g., to Improve wireless charging efficiency in case of wireless charging).

In case the one or more beams correspond to charging beams used for wirelessly charging the wireless reception device, the default power level of the respective beam may correspond to a charging power level that exceeds a level complying with EMF regulations. In particular, the default power level of the respective beam may correspond to a maximum charging power level supported by the wireless reception device. Therefore, when the obstacle is detected to be in the transmission area (i.e., the radiation region) of the one or more beams, the output power of the respective beam may be set to the maximum charging power level (e.g., again, a power level that exceeds a level complying with EMF regulations) to improve wireless charging efficiency without causing health hazards. To essentially eliminate the risk of health hazards in case of wireless charging, decreasing the output power of the respective beam may include deactivating the respective beam entirely.

Instead of decreasing the output power of the respective beam (or deactivating the respective beam) when it is detected that the obstacle at least partially blocks the one or more beams with respect to the wireless reception device, an alternative beam direction may be used for each of the one or more beams so that the obstacle is no longer within the transmission area of the one or more beams, and the one or more beams may thus continue to be transmitted at a default power level. In some variants, environmental conditions may be taken into consideration and the alternative beam direction may hence result, for each of the one or more beams, in the respective beam being reflected before reaching the wireless reception device. For example, the direction of the respective beam may be altered to circumvent the obstacle before arriving at the wireless reception device.

Various ways of detecting the obstacle that enters the one or more beams based on a change in the electromagnetic environment associated with the one or more beams are generally conceivable. In one Implementation, each of the one or more beams may be transmitted in a repetitive waveform pattern comprising a detection phase and a transmission phase, wherein, in the detection phase, one or more detection pulses are transmitted and their echo is monitored prior to the transmission phase to detect the change in the electromagnetic environment associated with the one or more beams. The one or more detection pulses may correspond to short pulses dedicated to the detection of beam blockage. Each detection pulse may have a low total energy, i.e., the power level of a detection pulse may comply with EMF regulations. The transmission phase, on the other hand, may comprise a longer transmission pulse (e.g., charging pulse) at the default power level of the respective beam, as described above. The one or more detection pulses may be used in the sense of a radar system, wherein the echo of the one or more detection pulses is monitored to detect beam blockage. Monitoring the echo of the one or more detection pulses may comprise measuring at least one of an echo level (e.g., an amplitude of the echo) and a time from detection pulse transmission to echo reception. The duration of the transmission phase may be such that, if an obstacle (e.g., a human being) enters the beam, the total amount of energy transmitted before the subsequent detection pulse is within an amount that complies with EMF regulations.

The change in the electromagnetic environment associated with the one or more beams may alternatively or additionally be detected based on measuring a time from an end of the transmission phase to an end of an echo of the transmission phase. The end of the transmission phase may correspond to a trailing edge of a transmission pulse (e.g., a charging pulse) and the end of the echo of the transmission phase may correspond to a trailing edge of the echo of the transmission pulse. Thus, instead of using separate detection pulses for the detection of beam blockage, as described above, the transmission pulse itself may be used for the detection of beam blockage, which may be possible in cases where the echo to the transmission pulse returns after the end of the transmission pulse because, at that time, echoes of the transmission pulse are generally detectable since echoes are no longer obscured by the higher power transmission of the transmission pulse itself.

Alternatively or additionally, two beams pointing in the same direction, one wider and one narrower, may be simultaneously formed. In such an implementation, each of the one or more beams may form an inner beam which Is shrouded by an outer beam pointing into a same direction as the inner beam, the outer beam being wider than the inner beam, wherein the change in the electromagnetic environment associated with the one or more beams may be detected based on a change in a reflection pattern of the outer beam (such change in the reflection pattern may be determined using detection pulses, as described above, for example). In such a scenario, the outer beam may be used for the detection of beam blockage and the Inner beam may be used for the actual wireless transmission (e.g., for wireless charging). The outer beam may in this case be distinguished from the inner beam by at least one of a different frequency and a different transmission pattern, for example. Also, the outer beam may have a lower power level than the Inner beam and, when a change in the reflection pattern of the outer beam is detected, the power level of the inner beam may be decreased (or the inner beam may be turned off), as described above. In one variant, the power level of the outer beam may not be decreased when decreasing the power level of the respective beam (i.e., the inner beam). In this case, the power level of the outer beam may be low enough to remain on when the obstacle enters the outer beam (i.e., the power level of the outer beam may comply with EMF regulations) so that the outer beam can be used to detect the obstacle exiting the outer beam again and, hence, to safely increase the power level of the inner beam (or turn on the inner beam) again when the obstacle exits the outer beam.

Generally, detecting a change in the electromagnetic environment associated with the one or more beams may be carried out using one or more detectors. The one or more detectors may be comprised by (i.e., form part of) the wireless transmission device 100 or may be disposed at locations separate from the wireless transmission device 100. If the wireless transmission device 100 is a communications transceiver, in particular when the transceiver is capable of performing full duplex transmissions, the detector may be the receiver portion of the transceiver.

In a scenario with detectors disposed separately from the wireless transmission device 100, the change in the electromagnetic environment associated with the one or more beams may be detected using one or more detectors placed remotely from the wireless transmission device 100, wherein the one or more detectors may be configured to detect changes in an electromagnetic radiation pattern observable in a transmission area (i.e., radiation region) of the one or more beams (e.g., in a room). The electromagnetic radiation pattern observed by the one or more detectors may in such a case not only depend on the one or more beams transmitted by the wireless transmission device 100 itself, but also on any other wireless transmitters present at or close to the transmission area, such as WLAN access points in a room or building, for example. When an obstacle (e.g., a person) enters the transmission area and the resulting change of the electromagnetic radiation pattern is detected, the output power of the respective beam may be decreased or the respective beam may be deactivated, as described above. To avoid false alarms in scenarios with additional wireless transmitters that influence the electromagnetic radiation pattern observed in the transmission area, not only one, but multiple detectors may be employed. The change in the electromagnetic environment associated with the one or more beams may thus be detected using a plurality of detectors placed remotely from the wireless transmission device 100.

To increase detection accuracy, a machine learning based model may be employed to distinguish between obstacles sensitive to electromagnetic radiation (e.g., a human being) and obstacles Insensitive to electromagnetic radiation (e.g., a moving device or furniture) detected by the respective detectors, wherein decreasing the output power of the respective beam may (e.g., only) be performed when the obstacle is determined to be an obstacle sensitive to electromagnetic radiation. In other words, machine intelligence may be employed to distinguish between safe and hazardous situations. The machine learning based model may be trained in a cloud computing environment (especially when the delays introduced by a cloud implementation do not lead to degraded performance) as more data may be available and processable in the cloud for the purpose of learning environmental characteristics and safe/hazardous situations.

In the foregoing description, the technique presented herein has been described for the case that the wireless transmission device 100 serves a single wireless reception device. It will be understood, however, that the wireless transmission device 100 may serve multiple wireless reception devices within its coverage range in the same manner. In such a case, the wireless transmission device 100 may transmit, to each of one or more additional wireless reception devices, one or more additional beams, wherein the wireless transmission device may serve the wireless reception device 100 and the one or more additional wireless reception devices according to a round robin strategy or according to priorities of the respective wireless reception devices, for example. The following FIGS. 3 to 6 illustrate certain aspects of the implementations described above in order to further elucidate the technique presented herein.

FIG. 3 illustrates an exemplary waveform pattern which may be used by the wireless transmission device 100 to transmit the one or more beams to the wireless reception device. In the shown example, the repetitive waveform pattern comprises a short detection pulse 302 and a longer transmission pulse 304 (e.g., a charging pulse). In between the detection pulse 302 and the transmission pulse 304, a listening interval is provided which allows detecting an echo to the detection pulse 302. The waveform pattern may repeat until all charging needs of the wireless reception device have been met. In the middle part and the bottom part of FIG. 3, echoes are shown for the case of the absence and the case of the presence of an obstacle that blocks the transmitted beam. The middle part of FIG. 3 corresponds to the reflection situation in the absence of an obstacle (e.g., an empty room), where the echo 306*a* to the detection pulse 302 is detected in the listening interval at some time and with an amplitude $a_0$. Reference numeral 308 denotes the echo to the transmission pulse 304. The bottom part of FIG. 3, on the other hand, corresponds to the reflection situation in the presence of an obstacle (e.g., when a person enters the transmitted beam), where the echo 306*b* to the detection pulse 302 is detected in the listening interval at some time $t_1$ and with an amplitude $a_1$. As may be seen in the figure, due to the obstacle blocking the transmitted beam, echo 306*b* is detected earlier than echo 306*a* ($t_1 < t_0$) and the amplitude of echo 306*b* is less than the amplitude of echo 306*a* ($a_1 < a_0$). These changes in time and amplitude of the echo represent changes in the electromagnetic environment associated with the transmitted beam. Measured changes in time and amplitude of the echo may thus be used (individually or in combination) to detect an obstacle entering or exiting the transmitted beam.

FIG. 4 illustrates an exemplary transmission pulse 304 (e.g., charging pulse) and an echo 308 to the transmission pulse 304 that is used for detection of beam blockage. Here, instead of using separate detection pulses for the detection of beam blockage, the transmission pulse 304 itself is used for the blockage detection. This is generally possible when the echo 308 to the transmission pulse 304 ends after the trailing edge of the transmission pulse 304 and when there is a listening interval after the transmission pulse 304. While, during the overlap of the transmission pulse 304 and the echo 308, the echo 308 is obscured by the higher power transmission of the transmission pulse 304 and thus hard to detect, the end of the echo 308 can be detected in the listening Interval as there Is no overlap between the transmission pulse 304 and its echo 308.

FIG. 5 illustrates an exemplary implementation in which an outer beam 503 shrouds an inner beam 504 (i.e., the actual beam to be transmitted) which are simultaneously transmitted from the wireless transmission device 100 to a wireless reception device 502. The top part of FIG. 5 shows an unblocked situation in which the inner beam 504 is turned on. The bottom part of FIG. 5 shows a situation in which the outer beam 503 is partially blocked by an obstacle 506, in which case the inner beam 504 is turned off once the corresponding change in the reflection pattern of the outer beam 503 has been detected.

FIG. 6*a* illustrates an exemplary room geometry in which the wireless transmission device 100 transmits a beam to a wireless reception device 602 and in which multiple detectors 604 configured to detect changes in the electromagnetic radiation pattern observable in the transmission area of the beam (i.e., the radiation region of the beam in the room) are placed remotely from the wireless transmission device 100. The detectors 604 may be connected (e.g., wireless or wire-bound) to the wireless transmission device 100 in order to report detection results to the wireless transmission device 100. In FIG. 6*a*, the transmitted beam itself is Indicated by solid lines, whereas its reflection is indicated using dashed lines (note: only the first reflection is shown and further reflections are omitted for clarity of illustration). In the shown example, no obstacle is present and, therefore, the transmitted beam is not blocked and can freely proceed towards the wireless reception device 602.

Figure 6B:
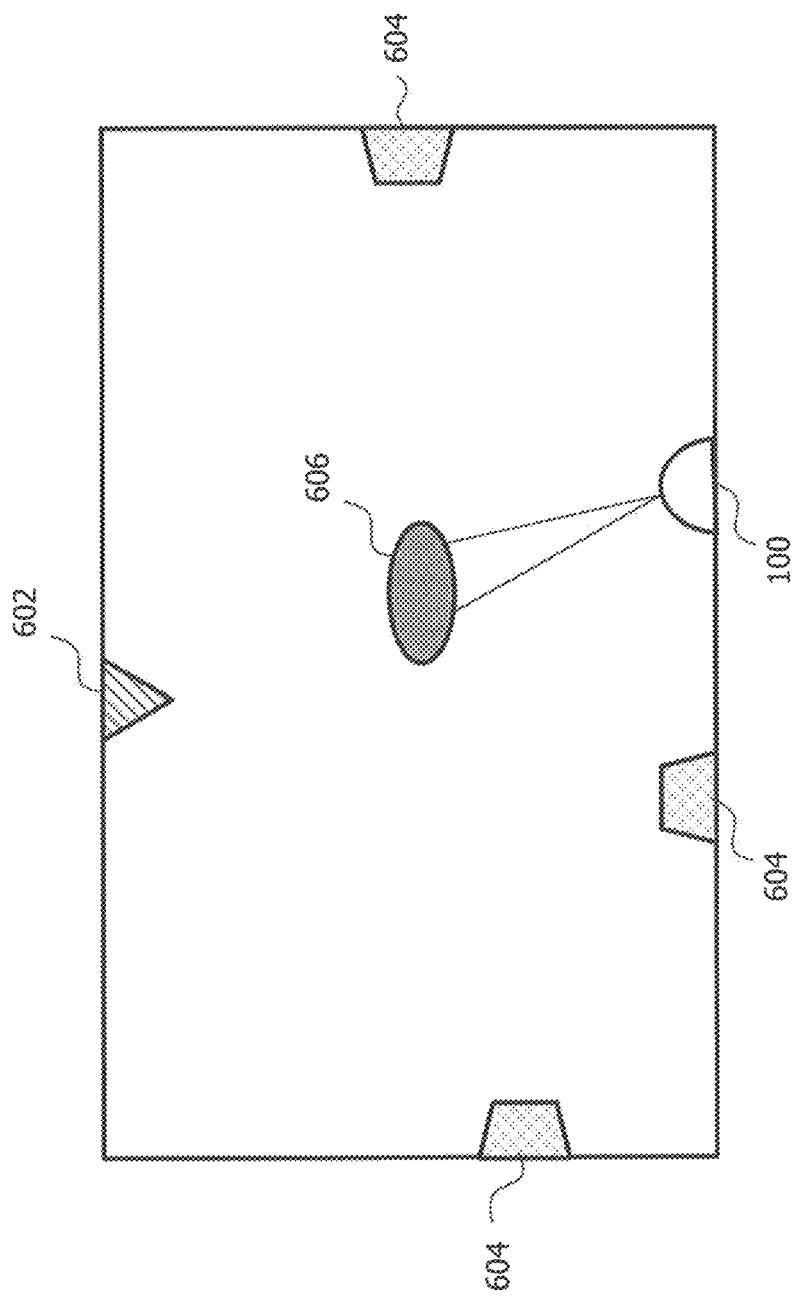
FIG. 6b illustrates the room geometry of FIG. 6a in case of presence of an obstacle blocking the transmitted beam.
Figure 6D:
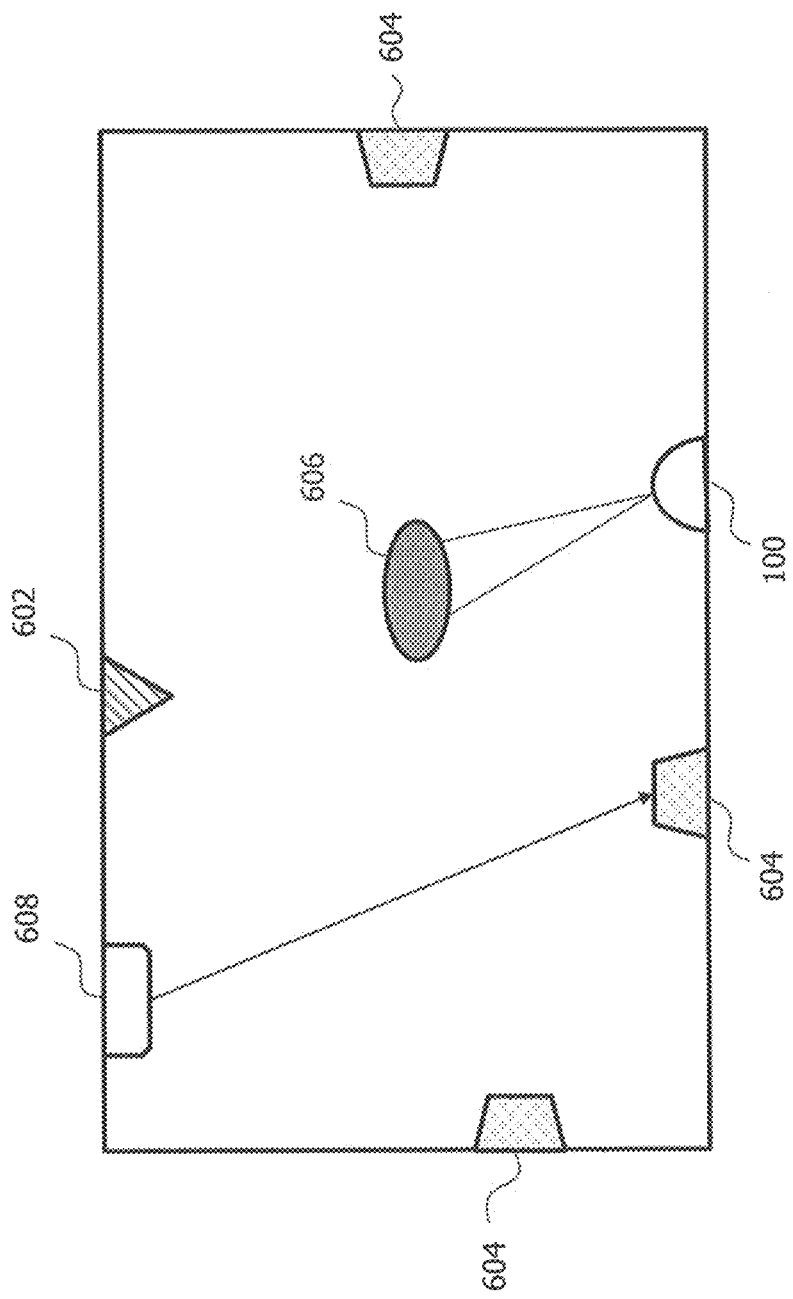
FIG. 6d illustrates the room geometry of FIG. 6a in case of presence of an obstacle blocking the transmitted beam and presence of an additional wireless transmitter whose beams are not blocked by the obstacle.
Figure 6F:
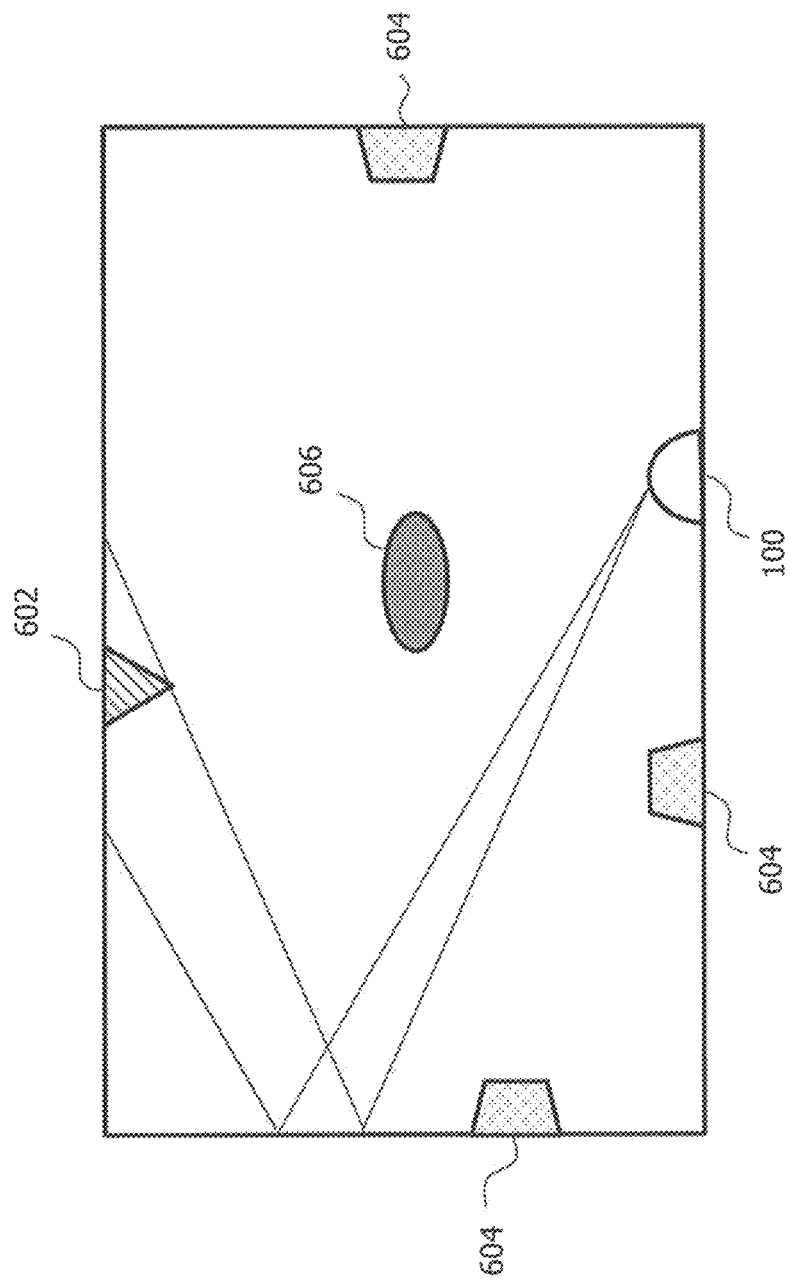
FIG. 6f Illustrates the room geometry of FIG. 6a in case an alternative beam direction being reflected before reaching the wireless reception device is used to circumvent the obstacle.

The following FIGS. 6*b* to 6*f* illustrate variations of the situation shown FIG. 6*a*. FIG. 6*b* shows a situation in which the transmitted beam is blocked by an obstacle 606 (e.g., a person entering the beam). In this case, the wireless transmission device 100 detects beam blockage and may decrease the output power of the transmitted beam or turn off the beam accordingly. FIG. 6*c* shows a situation in which the transmitted beam can freely proceed towards the wireless reception device 602, but a reflection of the transmitted beam cannot proceed towards the detector 604 at the bottom of the figure because the reflection is blocked by the obstacle 606. This situation shows that a remotely placed detector 604 can be shadowed even if the main beam is not blocked so that a false alarm could generally be raised. FIGS. 6d and 6e depict situations equivalent to those of FIGS. 6b and 6c, the only difference being that another radiation source, namely a wireless transmitter 608 (e.g., a WLAN access point) is provided in the room. In case of FIG. 6d, beams transmitted from the wireless transmitter 608 can freely proceed towards the detector 604 at the bottom of the figure, whereas, in case of FIG. 6e, such beams are blocked by the obstacle 606. At the detectors 604 as well as at the wireless transmission device 100, the combined energy received from the beams transmitted from the wireless transmission device 100 as well as from the wireless transmitter 608 is then detected and used to assess the beam blockage situation. To improve the distinction between main beam blockage and false alarms, multiple (three) detectors 604 are provided in the shown example. Finally, FIG. 6f depicts a situation in which, when it is detected that the obstacle 606 blocks the main beam, an alternative beam direction which results in the respective beam being reflected before reaching the wireless reception device 604 may be used to circumvent the obstacle 606.

Figure 7:
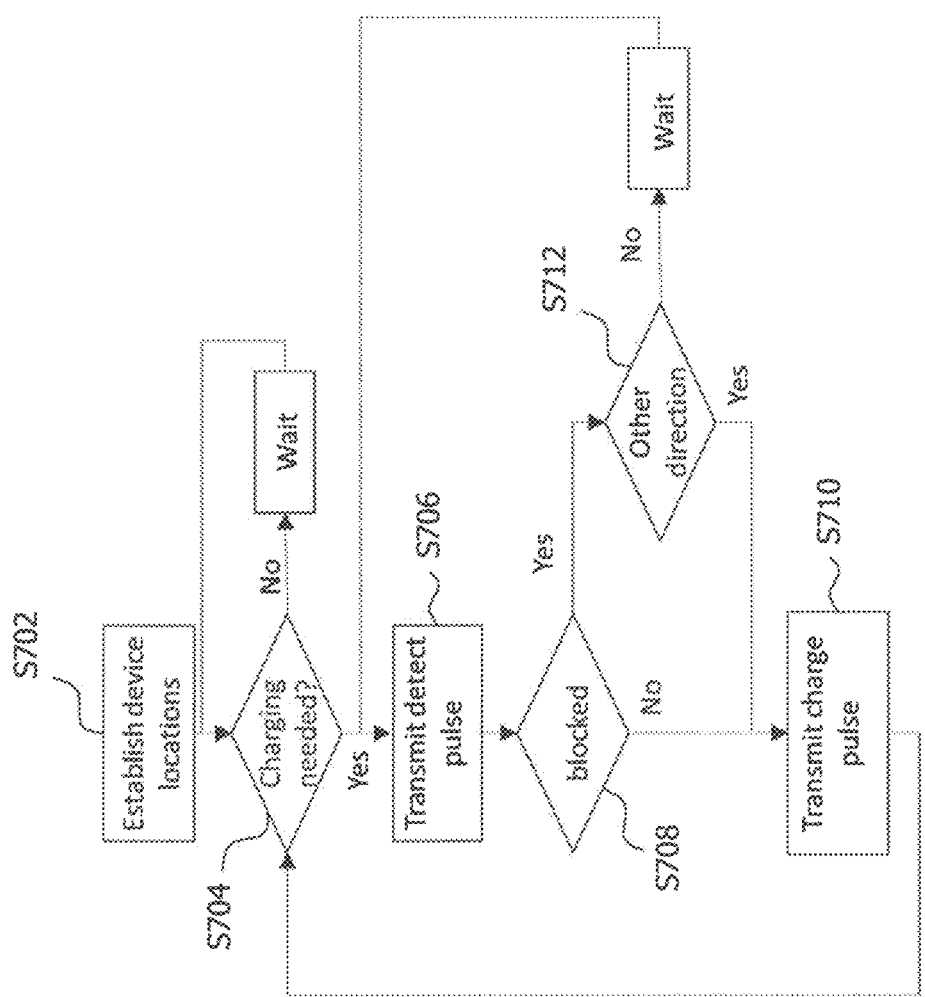
FIG. 7 illustrates an exemplary flowchart for performing a charging operation in accordance with an embodiment of the present disclosure.

FIG. 7 illustrates an exemplary flowchart for performing a charging operation in accordance with an embodiment of the present disclosure. In step S702, a location of a wireless reception device is established, wherein the wireless reception device may signal a charging need to the wireless transmission device 100. In step S704, it is determined whether charging is needed and, if not, the wireless transmission device 100 may wait with the transmission of charging beams until the wireless reception device needs charging. If, on the other hand, charging Is needed, the wireless transmission device 100 may transmit, in step S706, a detection pulse to detect beam blockage. In step S708, it is then determined whether the beam is blocked and, if not, the wireless transmission device 100 may transmit a charging pulse in step S710 to wirelessly charge the wireless reception device. If it is determined that the beam is blocked, on the other hand, the wireless transmission device 100 may determine in step S712 whether another beam direction is possible for charging the wireless reception device. If yes, a charging pulse is transmitted in the alternative beam direction and, if not, the wireless transmission device 100 may wait for a certain period of time and retransmit the detection pulse to see whether beam blockage still persists. It will be understood that the charging operation Illustrated in FIG. 7 is merely exemplary and that various other operations based on the Implementations described above are generally conceivable.

As has become apparent from the above, the present disclosure provides a technique for performing power level control of one or more beams transmitted by a wireless transmission device to a wireless reception device. In particular, the presented technique may provide a reliable method for avoiding potential EMF regulation violations and for prevention of health hazards of living bodies entering the transmitted beams. Through the capability of detecting when a person enters or exits a beam currently being transmitted, the allowable output power density may be increased as soon as it is detected that no living body blocks the beam. In case of wireless charging, the charging efficiency may thus be significantly improved, thereby fostering the use of remotely charged battery-less devices or prolonging the lifetime of battery-powered devices, while ensuring that no living bodies are exposed to electromagnetic radiation exceeding EMF regulations. In case of a mere communication setting, the output power adjustments may improve the communication throughput. If multiple detectors are used to detect beam blockage, detection accuracy may be improved. The same may apply if machine Intelligence is employed, as described above.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for control of one or more beams transmitted by a wireless transmission device to a wireless reception device, the method being performed by the wireless transmission device and comprising:
    transmitting each of the one or more beams at a default power level of the respective beam;
    detecting an obstacle entering the one or more beams based on a change in an electromagnetic environment associated with the one or more beams, the obstacle, once entered, at least partially blocking the one or more beams with respect to the wireless reception device; and
    responsive to detecting the obstacle, transmitting each of the one or more beams in an alternative beam direction such that the obstacle is no longer within any of the one or more beams;
    wherein each of the one or more beams forms an inner beam which is shrouded by an outer beam pointing in a same direction as the inner beam, the outer beam being wider than the inner beam;
    wherein the change in the electromagnetic environment associated with the one or more beams is detected based on a change in a reflection pattern of the outer beam.

2. A non-transitory computer readable recording medium storing a computer program product for control of one or more beams transmitted by a wireless transmission device to a wireless reception device, the computer program product comprising software instructions which, when run on processing circuitry of the wireless transmission device, causes the wireless transmission device to:
    transmit each of the one or more beams at a default power level of the respective beam;
    detect an obstacle entering the one or more beams based on a change in an electromagnetic environment associated with the one or more beams, the obstacle, once entered, at least partially blocking the one or more beams with respect to the wireless reception device; and
    responsive to detecting the obstacle, transmit each of the one or more beams in an alternative beam direction such that the obstacle is no longer within any of the one or more beams;
    wherein each of the one or more beams forms an inner beam which is shrouded by an outer beam pointing in a same direction as the inner beam, the outer beam being wider than the inner beam;
    wherein the change in the electromagnetic environment associated with the one or more beams is detected based on a change in a reflection pattern of the outer beam.

3. A wireless transmission device configured to control one or more beams transmitted by the wireless transmission device to a wireless reception device, the wireless transmission device comprising:
processing circuitry;
memory containing instructions executable by the processing circuitry whereby the wireless transmission device is operative to:
transmit each of the one or more beams at a default power level of the respective beam;
detect an obstacle entering the one or more beams based on a change in an electromagnetic environment associated with the one or more beams, the obstacle, once entered, at least partially blocking the one or more beams with respect to the wireless reception device; and
responsive to detecting the obstacle, transmit each of the one or more beams in an alternative beam direction such that the obstacle is no longer within any of the one or more beams;
wherein each of the one or more beams forms an inner beam which is shrouded by an outer beam pointing in a same direction as the inner beam, the outer beam being wider than the inner beam;
wherein the change in the electromagnetic environment associated with the one or more beams is detected based on a change in a reflection pattern of the outer beam.

4. The wireless transmission device of claim 3, wherein the predetermined threshold power level of the respective beam is set to comply with an electromagnetic field regulation preventing exposure of the obstacle to excessive electromagnetic radiation.

5. The wireless transmission device of claim 3, wherein the instructions are such that the wireless transmission device is operative to:
decrease, for each of the one or more beams, an output power of the respective beam from the default power level of the respective beam to a predetermined threshold power level of the respective beam; and
increase, for each of the one or more beams, the output power of the respective beam from the predetermined threshold power level of the respective beam to the default power level of the respective beam, when it is detected that the obstacle no longer blocks the one or more beams with respect to the wireless reception device.

6. The wireless transmission device of claim 3, wherein the one or more beams correspond to charging beams used for wirelessly charging the wireless reception device.

7. The wireless transmission device of claim 6, wherein the default power level of the respective beam corresponds to a maximum charging power level for the wireless reception device.

8. The wireless transmission device of claim 3, wherein, for each of the one or more beams, the alternative beam direction results in the respective beam being reflected before reaching the wireless reception device.

9. The wireless transmission device of claim 3:
wherein each of the one or more beams is transmitted using a repetitive waveform pattern comprising a detection phase and a transmission phase;
wherein, in the detection phase, one or more detection pulses are transmitted and their echo is monitored prior to the transmission phase to detect the change in the electromagnetic environment associated with the one or more beams.

10. The wireless transmission device of claim 9, wherein monitoring the echo of the one or more detection pulses comprises measuring at least one of an echo level and a time from detection pulse transmission to echo reception.

11. The wireless transmission device of claim 3, wherein the change in the electromagnetic environment associated with the one or more beams is detected based on measuring a time from an end of a transmission phase to an end of an echo of the transmission phase.

12. The wireless transmission device of claim 3, wherein the outer beam is distinguished from the inner beam by at least one of a different frequency and a different transmission pattern.

13. The wireless transmission device of claim 3, wherein the outer beam has a lower power level than the inner beam.

14. The wireless transmission device of claim 5, wherein the power level of the outer beam is not decreased when decreasing the output power loyal of the respective beams.

15. The wireless transmission device of claim 3:
wherein the change in the electromagnetic environment associated with the one or more beams is detected using one or more detectors placed remotely from the wireless transmission device; and
wherein the one or more detectors are configured to detect changes in an electromagnetic radiation pattern observable in a transmission area of the one or more beams.

16. The wireless transmission device of claim 15, wherein the change in the electromagnetic environment associated with the one or more beams is detected using a plurality of detectors placed remotely from the wireless transmission device.

17. The wireless transmission device of claim 15:
wherein a machine learning based model is employed to distinguish between obstacles sensitive to electromagnetic radiation and obstacles insensitive to electromagnetic radiation detected by the respective detectors; and
wherein transmitting each of the one or more beams in the alternate beam direction is performed when the obstacle is determined to be an obstacle sensitive to electromagnetic radiation.

18. The wireless transmission device of claim 17, wherein the machine learning based model is trained in a cloud computing environment.

19. The wireless transmission device of claim 3, wherein the instructions are such that the wireless transmission device is operative to:
transmit, to each of one or more additional wireless reception devices, one or more additional beams, and
serve the wireless reception device and the one or more additional wireless reception devices according to a round robin strategy or according to priorities of the respective wireless reception devices.

20. A system, comprising:
a wireless reception device;
a wireless transmission device configured to control one or more beams transmitted by the wireless transmission device to the wireless reception device, the wireless transmission device comprising:
processing circuitry;
memory containing instructions executable by the processing circuitry whereby the wireless transmission device is operative to:
transmit each of the one or more beams at a default power level of the respective beam;
detect an obstacle entering the one or more beams based on a change in an electromagnetic environment associated with the one or more beams, the obstacle, once entered, at least partially blocking the one or more beams with respect to the wireless reception device; and responsive to detecting the obstacle, transmit each of the one or more beams in an alternative beam direction such that the obstacle is no longer within any of the one or more beams;

wherein each of the one or more beams forms an inner beam which is shrouded by an outer beam pointing in a same direction as the inner beam, the outer beam being wider than the inner beam;

wherein the change in the electromagnetic environment associated with the one or more beams is detected based on a change in a reflection pattern of the outer beam.

* * * * *